(No Model.)
F. GAUNT.
POTATO PLANTER.
No. 548,437. Patented Oct. 22, 1895.
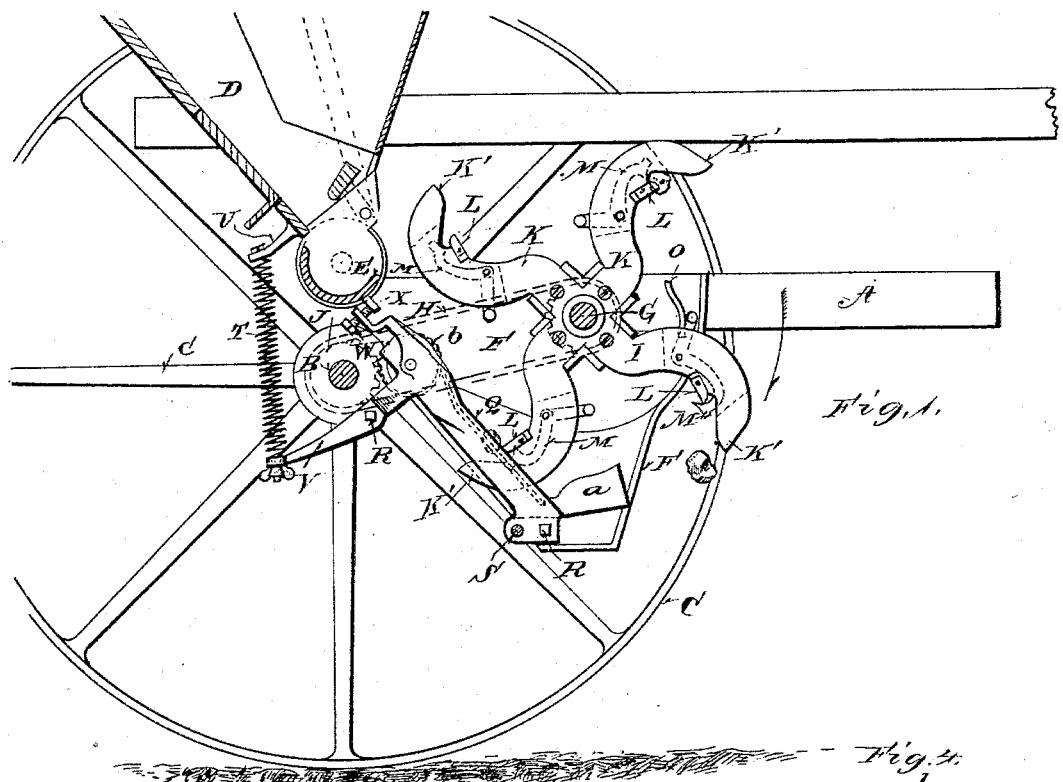
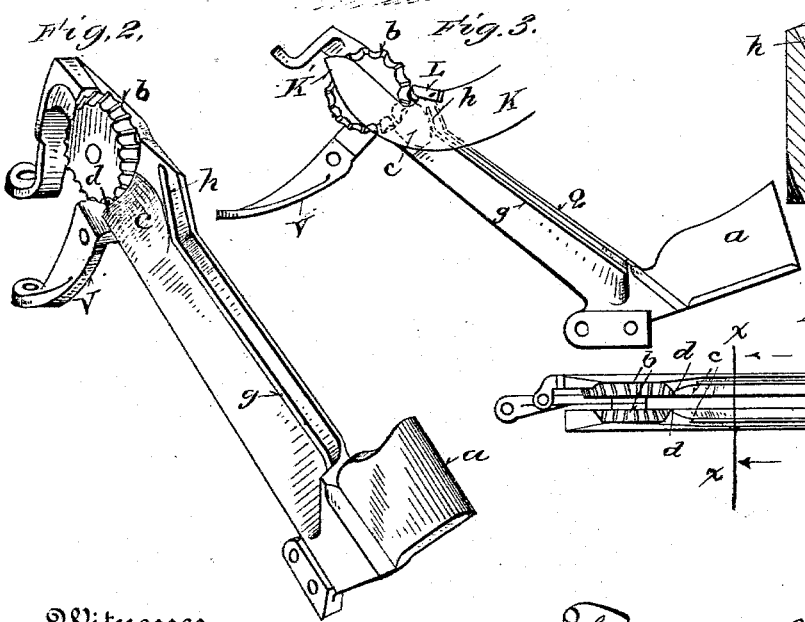
Witnesses
Jas. R. Dawley
W. M. McNair
Inventor
Fillmore Gaunt,
By his Attorney
H. A. Toulmin

UNITED STATES PATENT OFFICE.

FILLMORE GAUNT, OF WOODSTOWN, NEW JERSEY.

POTATO-PLANTER.

SPECIFICATION forming part of Letters Patent No. 548,437, dated October 22, 1895.

Application filed June 7, 1895. Serial No. 551,938. (No model.)

*To all whom it may concern:*

Be it known that I, FILLMORE GAUNT, a citizen of the United States, residing at Woodstown, in the county of Salem and State of New Jersey, have invented certain new and useful Improvements in Potato-Planters, of which the following is a specification, reference being had therein to the accompanying drawings.

This invention relates to certain new and useful improvements in potato-planters; and it has particular reference to an improved construction of the bars which constitute the slotted rear wall of the potato or seed receptacle, which feeds potatoes or seed to the impaling-arms with their knives. This general subject-matter is embraced in Letters Patent granted to me September 11, 1894, No. 525,893, for potato-planters, and my present object is to improve the construction therein disclosed as to these bars, so as to increase the efficiency and utility of the machine and thereby enhance its practical and commercial value, such machine having already been manufactured and sold on the market.

The special object which I have in view at this time to be carried out by my present improvements is to make more certain and absolute the act of impaling the potatoes or seeds by the impaling-knives and more certain and regular the guidance of the potatoes or seeds from between the bars to the deflecting-wheels, and thence off of them.

In the accompanying drawings, on which like reference-letters indicate corresponding parts, Figure 1 is a partial sectional view and side elevation of a potato-planter of the same general type and character as that illustrated in my Letters Patent above mentioned; Fig. 2, a detail perspective view, on an enlarged scale, of one of the potato-guiding bars; Fig. 3, a side elevation of the same; Fig. 4, an enlarged cross-sectional view of such bars, taken on the line $x\ x$ of Fig. 5; and Fig. 5, a plan view of such bars.

A general frame A is mounted on an axle B, carried by ground-wheels C, and to the frame is secured a feed-hopper D with a feed-valve E, a seed-receptacle F, and a rotatable shaft G, receiving motion through a sprocket-chain H, mounted on sprocket-gears I of the shafts G and J of the axle B, whereby rotary motion is imparted to the shaft G, the wheels C having any approved form of clutch connection (not shown) with the axle B.

On the shaft G is mounted one or more sets of impaling-arms K, each set consisting of preferably four arms, as shown, each arm being provided with an impaling-knife L and each with a pivoted pusher or stripper M, adapted to engage with a fixed cam O as the impaling-bars are rotated, so as to disengage a potato or seed from the knives at the proper time to drop the potato or seed in the furrow for planting. All of the description so far given relates to parts embraced in the patent above described, and will be fully understood when taken in connection with said patent.

I will now refer to the special feature of importance embraced in this invention—namely, to the guiding-bars Q, which correspond generally with the bars 30 of said patent. Two of these bars constitute a pair or set, and there is one pair or set for each set of impaling-arms, which latter are adapted to rotate with their projecting fingers K′ in between the bars Q. These bars occupy the position shown in Fig. 1, and constitute a slotted rear wall or a portion of the rear wall of the receptacle F. The bars are bolted together, as shown at R, and are hung upon a cross-rod S at their lower ends and supported at their upper ends by a yielding connection consisting of a spring T, held by a lug U and connecting with an extension V of the bars. An adjustable stop fixes the forward limit of the upper ends of the bars Q, said stop consisting of a set-screw W and a lug X. So far, also, the guiding-bars are the same as set out in my said patent; but I now reach the points of difference which constitute the present improvements. I would first mention the head or weight $a$, which projects from one of the bars near its lower end and operates as a partial counterbalance to support the bars Q in their normal inclined position, so as to require less strength on the part of the spring T. Hence a more delicate spring can be used, and therefore a spring which will yield more readily and sensitively to slight pressure created by the impaling arms or knives in acting against the potatoes or seeds, either in the act of impaling or in the act of the potatoes or seeds in being freed from the bars Q or their deflecting-wheels $b$.

These wheels are substantially the same as the wheels 32 in my said patent, and perform substantially the same function *per se*, but coact to produce a better result in connection with a certain concave surface c, which constitutes another improvement.

It will be seen that each of the bars Q at a point in advance of the wheels b are concaved, as shown more clearly in Figs. 2 and 5, and that the respective wheels b lie behind the respective concavities c, so that the inner termination of the concavities formed by the edge d are in line with the lower half or portion of each wheel. (See Figs. 2, 4, and 5.) From the points e to the points f such edges of the concaves deflect outward and expose a portion of the wheels to contact by the potatoes or seeds as the same move through the concavities to said wheels. Thus it will be understood that these concavities receive the potatoes or seeds as they pass along the channel between the bars Q and approach the point where they are to be directed out of such channel. The function of these concavities is, therefore, that of so receiving the potatoes or seeds and of directing them to the wheels by whose rotative action they are relieved of frictional resistance, while by the sensitiveness of the bars Q to depression they are relieved of liability to be mashed. Incidentally, also, the potatoes or seeds are impaled either during their passage through the concavities or their travel on the wheels, or partially on both, in those instances where in practice they may fail to become impaled during their travel in the channel-bars Q. This brings me to a description of the latter operation.

Viewing Fig. 1, it will be understood that the potatoes or seeds in the receptacle F are engaged by the impaling-arms K, whose action pushes along in the channel between the bars Q. Each bar is provided with a longitudinal bead or rib g, which deflects off, as seen at h, so as to run in the general direction assumed by the potatoes or seeds as they pass away from the bars. These longitudinal ribs are in lieu of the inclined ribs 31 in my said patent, and their function is to so retain the potatoes or seeds in the channel that they will travel properly with respect to the rotating impaling-arms, so as to be impaled by the knives L as they travel along the channel, or, if not that, so as to be kept within the channel and properly directed into the concavities, after which they will be impaled. Thus I would term the concavities "guiding-surfaces," and thus I would term these ribs "retaining-ribs."

Having thus fully described my invention, what I claim as new, and desire to secure by Letters Patent, is—

1. In a potato planter, the combination with a receptacle and movable impaling arms provided with knives substantially as described, of bars constituting a slotted wall for the receptacle, said bars having each a retaining rib, a guiding concave and a deflecting wheel.

2. In a potato planter, the combination with a receptacle and movable impaling arms having impaling knives substantially as described, of bars constituting a slotted wall for said receptacle, each bar having a longitudinal retaining rib, a concave guiding surface and a deflecting wheel, the terminating edges of the concavities being directed to expose a portion of the periphery of the wheels to the potatoes or seeds within the concavities.

3. In a potato planter, the combination with a receptacle and movable impaling arms having impaling knives substantially as described, of bars constituting a slotted wall for said receptacle, the bars being pivotally mounted and having a counterbalancing weight at one side and a supporting spring at the other side of their pivot, and each bar having a retaining rib, a concave guiding surface and a deflecting wheel.

4. In a potato planter, the combination with a receptacle and movable impaling arms having impaling knives, substantially as described, of bars forming a slotted wall for said receptacle, the bars being pivoted and having a counterbalance weight at one side and a supporting spring at the other side of the pivot.

5. In a potato planter, guiding bars for the potatoes or seeds arranged in a pair and each provided with a longitudinal retaining rib, a concave guiding surface and a deflecting wheel.

6. In a potato planter, guiding bars arranged in a pair and each having a longitudinal guiding rib.

7. In a potato planter, guiding bars arranged in a pair and each provided with a concave guiding surface.

8. In a potato planter, guiding bars arranged in a pair and each provided with a concave guiding surface and a deflecting wheel, a part of the periphery of each wheel being exposed to contact by potatoes or seeds in the concavities.

In testimony whereof I affix my signature in presence of two witnesses.

FILLMORE GAUNT.

Witnesses:
OLIVER H. MILLER,
W. M. MCNAIR.